United States Patent [19]

Nuhn et al.

[11] Patent Number: 5,341,370
[45] Date of Patent: Aug. 23, 1994

[54] DATA TRANSFER BETWEEN HIGH BIT RATE BUSES VIA UNSHIELDED LOW BIT RATE BUS

[75] Inventors: Derek J. Nuhn, Ottawa; Gordon W. Servant, Kanata; Robert P. Brennan, Pakenham; George A. Jeffrey, Buckingham, all of Canada

[73] Assignee: Pascal & Associates, Canada

[21] Appl. No.: 25,838

[22] Filed: Mar. 3, 1993

Related U.S. Application Data

[62] Division of Ser. No. 541,050, Jun. 20, 1990, Pat. No. 5,220,561.

[51] Int. Cl.$^5$ .......................... H04B 3/00; H04L 5/22
[52] U.S. Cl. .................................. 370/84; 370/105.1; 370/110.1; 375/36; 379/165
[58] Field of Search ............... 370/84, 105.1, 79, 108, 370/58.1, 110.1; 375/121, 122, 36, 38, 8; 379/399, 94, 165

[56] References Cited

U.S. PATENT DOCUMENTS

| 4,766,402 | 8/1988 | Crane ................................. 375/36 X |
| 4,805,165 | 2/1989 | Kawamura et al. .................. 370/84 |
| 4,805,167 | 2/1989 | Leslie et al. ............................ 370/84 |
| 4,901,342 | 2/1990 | Jones ................................. 375/36 X |
| 5,177,738 | 1/1993 | Dell'Oro et al. ....................... 370/84 |
| 5,220,561 | 6/1993 | Nuhn et al. ............................ 370/84 |

*Primary Examiner*—Benedict V. Safourek
*Assistant Examiner*—Melvin Marcelo
*Attorney, Agent, or Firm*—Laff, Whitesel, Conte & Saret

[57] ABSTRACT

A method and apparatus for transferring high data rate data between a pair of separated high data rate buses comprising storing a group of high data rate data from one of the buses, one of which is connected to a digital telephone set, reading the stored data at a low data rate, conditioning the low data rate data to remove high frequency components therefrom, applying the conditioned data to an unshielded cable for transmission to the separated other high data rate bus, receiving and storing the conditioned data from the unshielded cable and reading the stored conditioned data at a high data rate to said other bus.

4 Claims, 4 Drawing Sheets

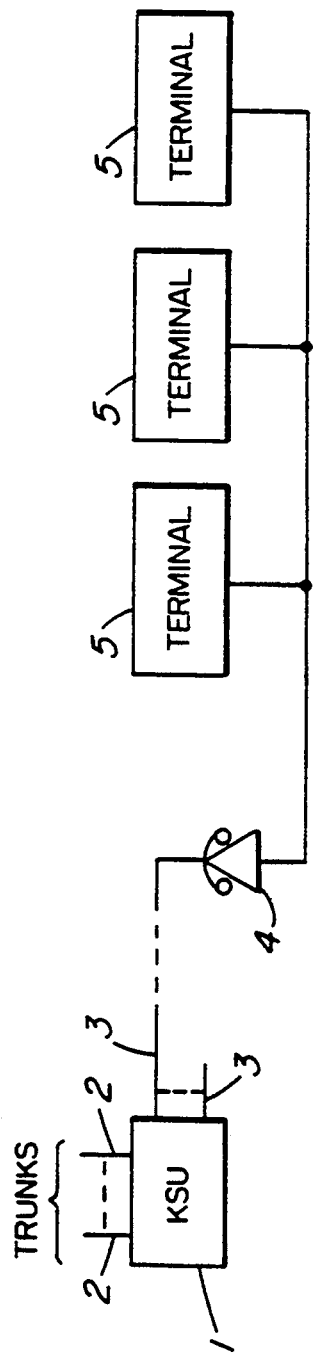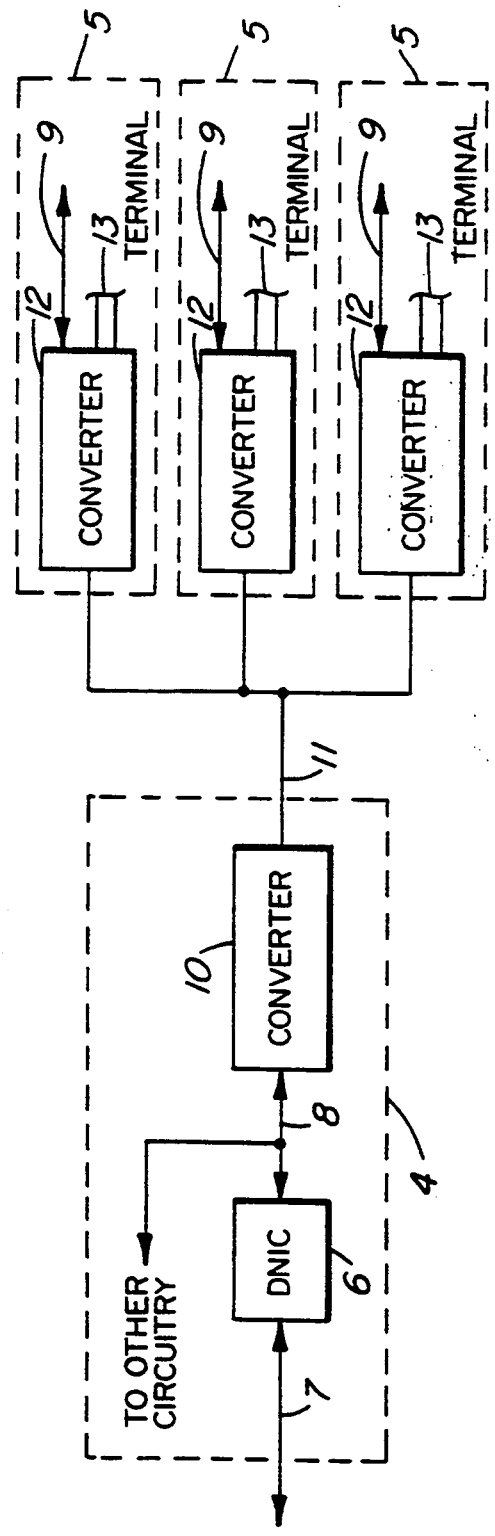

DATA TRANSFER BETWEEN HIGH BIT RATE BUSES VIA UNSHIELDED LOW BIT RATE BUS

This application is a division of prior application Ser. No. 07/541,050, filed Jun. 20, 1990 now U.S. Pat. No. 5,220,561.

This invention relates to a data transfer apparatus which is useful to transfer high bit rate data to remote terminals or peripherals without requiring the use of shielded cables.

The CCITT has standardized an integrated services digital network (ISDN) protocol by defining a so-called S-interface for transmitting data between various elements of a telephone system. The standard utilizes as what is referred to as 2B+D transmission, that is, transmission on a synchronous serial bus with two 8 bit data channels, referred to as B channels and an 8 bit control channel, that is a D channel. Each data word therefore is comprised of 24 bits. The bit rate is standardized at a high speed 2,048 kilobits per second.

The 2B+D protocol, while being used for transmission between systems, is sometimes modified within a system. For example, in some PABX's produced by Mitel Corporation the stream of data is divided into frames, each frame having a period of 125 microseconds. Each frame is divided into 32 8 bit channels, the first four of which are, in sequence, the D channel, an intermediate C channel, and the B channels. The D and C channels, while 8 bits long, utilize only the first 2 bits in each.

Whatever system is used, in order to conform to the CCITT standard, conforming telephone sets or other terminal devices have high data rate (e.g. 2,048 Kb/sec) links with the main control system such as a key telephone system.

It is desirable to be able to add peripheral functions to a basic telephone set to be used in an ISDN form of system. For example, a basic telephone set without special features can initially be provided, and as additional features are to be added, modules can be added to the system to provide the additional features and functions. The add-on modules, in order to meet the CCITT ISDN standard, may each require a 2B+D interface. However the add-on modules can be located a significant distance from the basic telephone set. For example the peripheral modules could be a voice announce module, an analog terminal adapter, a data transmission module, a specialized visual display module, etc. Those modules could be located, if not plugged directly into the telephone set or located meters away, even as far as one hundred meters or more from the basic telephone set.

The requirement to locate a peripheral module a significant distance from the telephone set using a high data rate bus presents a significant problem. The high data rate bus requires shielding in order to minimize radio frequency emissions. This is costly and presents installation problems involving a thick cable. It has been found that with the connection of the peripherals to the digital telephone set when the peripherals are located a significant distance from the telephone set, and especially when there are several peripherals connected to the telephone set, even with shielded cable the amount of radio frequency emissions increases to an intolerable level, interfering with the operation of nearby equipment and exceeding national standards.

The present invention is a data transfer apparatus which connects to the high speed bus of the telephone set or other 2B+D data signal generating apparatus or other ISDN high data rate signal generating apparatus, which converts the signal to a low data rate. Similar converting apparatus is connected to the high speed data inter face at each of the peripherals. The telephone set, or other corresponding central terminal, and the peripherals thereby communicate between themselves by means of a low data rate serial bus. With conditioning of the data pulse edges of signals transmitted on the low data rate bus, an unshielded bus cable can be used without generating adverse levels of radio frequency emissions. Indeed, rather than using a shielded cable, inexpensive standard four wire telephone cable can be used. This results in considerable cost reduction, minimization of interference with other equipment, and the ability to add additional peripheral equipment in a modular manner at minimum cost, while obtaining the benefits of ISDN and meeting the CCITT 2B+D channel standard external to the low data rate serial bus.

The above advantages are obtained in an embodiment of the invention which is a data transfer apparatus comprising first and second shift registers each having similar capacities, apparatus for writing incoming data from a first high data rate bus into the first shift register during a first predetermined time interval at a high bit rate, apparatus for reading the data stored in the first shift register onto a low data rate bus for outward transmission during a second predetermined time interval at a low bit rate, apparatus for writing incoming data from the low data rate bus into the second shift register during the interval when data stored in the first shift register is being read, apparatus for reading outgoing data from the second shift register to the first high data rate bus during the interval when data stored in the first shift register is being written, apparatus for providing a high bit rate clock signal, apparatus for providing a low bit rate clock signal, apparatus for clocking both first and second shift registers using the high bit rate clock signal during the first predetermined time interval, and apparatus for clocking both first and second shift registers using the low bit rate clock signal during the second predetermined time interval, the clocking intervals of the low and high bit rate clock signals alternating with each other.

Another embodiment of the invention is a data transfer apparatus between a terminal such as a telephone set having a first high bit rate serial data bus and plural peripherals, comprising a first converter connected to the data bus for converting high bit rate incoming data signals carried by the data bus to low bit rate signals and low bit rate incoming data signals to high bit rate outgoing data signals, plural second converters each at a peripheral for converting low bit rate incoming data signals to high bit rate outgoing data signals and high bit rate incoming data signals to low bit rate outgoing data signals, each of the converters comprising first and second shift registers each having the capacity of a data frame, apparatus for writing incoming data signals from a high data rate bus connected thereto into the first shift register during a data frame time interval at a high bit rate, apparatus for reading the data stored in the first shift register onto a low speed data rate bus for outward transmission during a data frame time interval at a low bit rate, apparatus for writing incoming data from the low data rate bus into the second shift register during the interval when data stored in the first shift register is being read, apparatus for reading data from the second shift register to the high data rate bus connected thereto during the interval when data stored in the first shift register is being written, apparatus for providing a separate high bit rate clock signal for each converter, apparatus for providing a separate low bit rate clock signal for each converter, apparatus for clocking both first and second shift registers of each converter using the respective high bit rate clock signal during the high data rate data frame time interval, and apparatus for clocking both first and second shift registers of each converter using the low bit rate clock signal during the low data rate data frame time interval, the clocking intervals of the low and high bit rate clock signals in each converter alternating with each other, apparatus for outwardly transmitting low data rate data between the peripherals on the low data rate bus and for receiving low data rate data from the low data rate data bus.

Preferably the clock at the peripheral units is generated by synchronization to frames of data received from the telephone set or terminal, rather than on a clock pulse by clock pulse basis. This ensures that no data will be lost due to a cycle slip caused by differences in clock frequencies between the telephone set and the peripheral units.

Rather than the shift registers having the capacities of a frame of data, they could alternatively have the capacities of data words, superframes, or some other convenient quantity. However for the 2B+D standard, a frame containing the 2B+D channels is the preferred capacity.

A better understanding of the invention will be obtained by reference to the detailed description below, and to the following Figures, in which:

FIG. 1 is a basic block diagram illustrating a system in which the invention is to be used, FIG. 2 is a basic block diagram of the invention.

Figure 3:
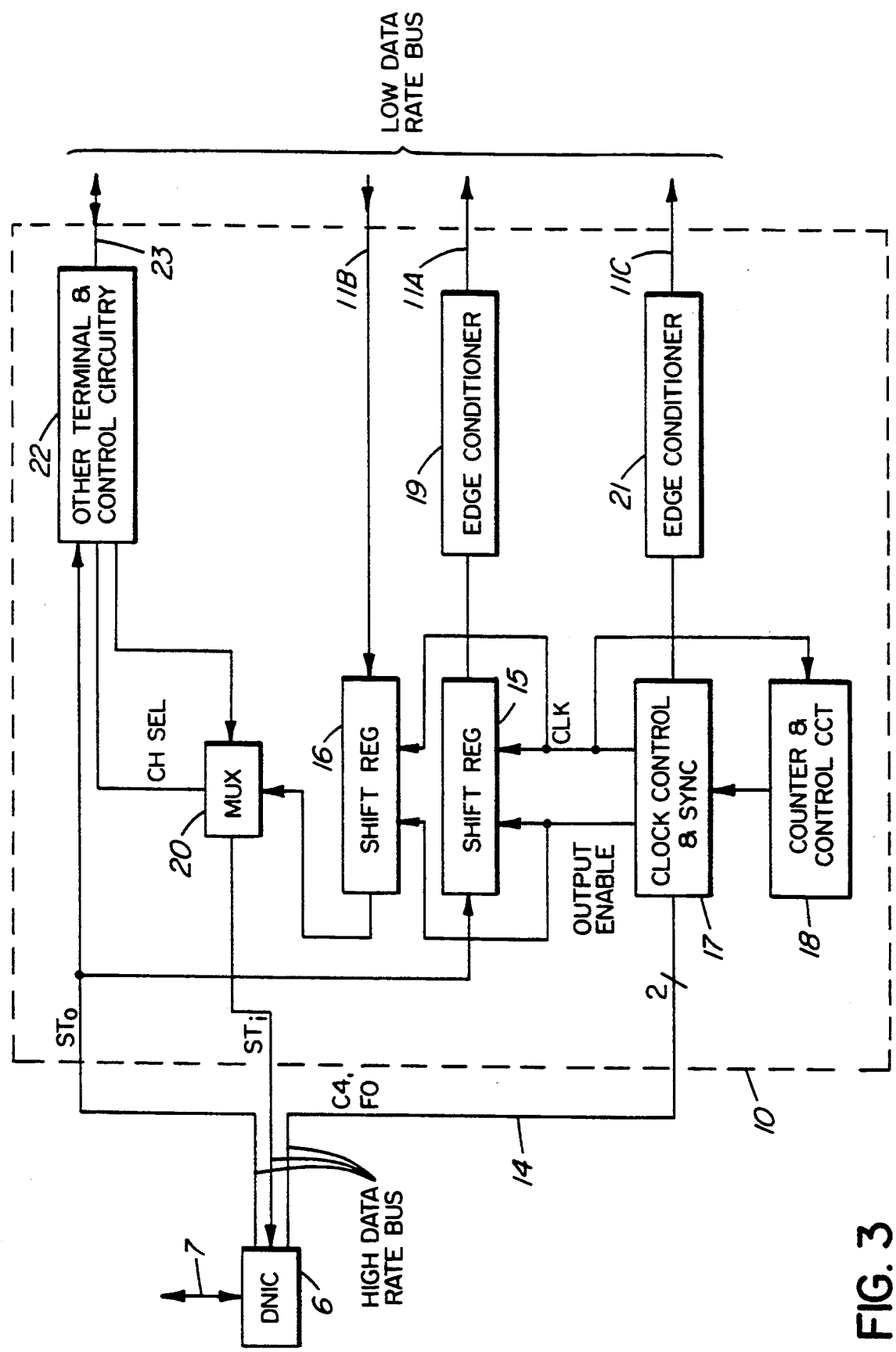
FIG. 3 is a block diagram of the converter at the telephone set or main terminal.

While the term telephone set will be used below in the description, it is intended that the term should be construed to mean any controlling terminal which is to communicate with peripheral terminals which have 2B+D interfaces or the equivalent for implementing the invention.

Turning now to FIG. 1, a key telephone system control unit KSU 1 has trunks 2 connected to it for communicating in a well known manner. In addition line circuits 3 which communicate also in an ISDN or other digital based format are provided, to which plural telephone sets such as telephone set 4 are connected. Terminals or peripherals which provide various functions, such as those described above, are connected to telephone set 4. The terminals 5 can be located a significant distance from telephone set 4. It is to the 1 ink between the telephone set 4 and terminals 5 to which the present invention is directed.

FIG. 2 illustrates a block diagram of such a link. Telephone set 4 contains a digital network interface unit (DNIC) 6 which communicates using a standard digital format via high data rate link 7 to the KSU. Thus each link 7 corresponds to a line circuit 3, what in analog terms would be called the subscriber loop. The digital network interface unit DNIC 6 is a known device, and is sold by Mitel Corporation under the code type MT8972. The output of the DNIC is a high data rate bus referred by Mitel Corporation in literature describing the MT8972 device as an ST bus 8. Bus 8 is a high data rate bus which is a variant of the CCITT standard 2B+D.

Each terminal 5 also has a corresponding high speed bus interface 9, which corresponds to the bus 8 in data rate and standard data transmission protocol.

Data signals in, for example, the ST bus standard thus normally appear on bus 8, are transmitted to terminals 5. Thus terminals 5 can communicate with other peripherals, other devices, etc. at the same data rate as if they were connected directly to DNIC 6.

As noted earlier, the distance of terminals 5 from telephone set 4, and the number of terminals 5 used has been found to cause objectionable radio frequency emissions even when they are connected by means of shielded cables. The present invention provides means for eliminating this problem.

In accordance with the present invention the telephone set 4 contains a first converter 10. Converter 10 is connected to high data rate serial bus 8 and converts the data thereon to low data rate signals, which are applied to low data rate bus 11.

Converter 10 also receives low data rate signals from bus 11 and converts them to high data rate signals in the format carried by bus 8 for application to bus 8.

Each of the terminals 5 contains a corresponding second converter 12 which receives low data rate signals from bus 11 and converts them to high data rate signals of the same format as the signals carried by bus 8, and applies them to corresponding bus 9. Preferably the low bit rate clock is obtained from the telephone set 4.

FIG. 3 illustrates a preferred embodiment of converter 10 in a more detailed block diagram. Refer also to the timing diagram of FIG. 5. The DNIC 6 high rate bus variant of the 2B+D CCITT bus, referred to as an ST bus, has an $ST_o$ (output) line and $ST_i$ (input) line, as well as a low bit rate clock and frame pulse output line 14 (C4, F0).

Two 24 bit shift registers 15 and 16 each having capacity of a 2B+D+2 unused bits +C+2 unused bits are used. High speed (data rate) data signal on the $ST_o$ line is applied to shift register 15. The clock on one of the leads of line 14 and the frame pulse FO on the second lead of line 14 are applied to clock control and synchronization circuit 17. When the frame pulse appears, the clock control and synchronization circuit 17 applies a clock signal at the high data rate (2,048 kb/sec) to shift register 15. A frame of the high data rate signal is as a result serially written into the shift register 15.

The $ST_o$ bus carries four data channels in a frame referred to as D, C, B, and B, the D and two B channels corresponding to the D and two B channels of the CCITT standard. As may be seen from the signal timing diagram in FIG. 5, at the left hand side of the top diagram, the shift register loads first the D, 2 unused bits, then the C plus 3 unused bits, then the two B channels, in sequence. At the above-noted high speed data rate, this takes 15.6 microseconds, as shown on the diagram.

The low bit rate (e.g. 256 Kb/sec) clock from line 14 at the output of circuit 17 is counted in counter and control circuit 18, which, after counting the clock counts corresponding to the number of bits of each 2B+C+D data word, applies a clock control signal (level change) to the clock control and synchronization circuit 17. As a result, circuit 17 switches its clock to a low data rate, i.e. 256 Kb/sec. This clock is applied to shift register 15.

Because the format of the Mitel system ST-BUS ™ is 8 bits for the D and C channels, 4 bits in each channel are ignored. The circuit switches after 32 bits. However other protocols may be used, within the scope of the invention.

Circuit 17 also applies a read control signal to the shift register, which terminates its writing mode and causes reading of the stored data therein at 256 kb/sec. This data is read out to edge conditioner 19, which reduces the rate of change (the rise and fall times) of the edges of the data pulses read from shift register 15, and rolls the corners of the data pulses, in order to remove high frequency components therefrom, and thereby to reduce or eliminate radio frequency harmonics. The output of the edge conditioning circuit is applied to the low data rate bus lead 11A.

While shift register 15 is controlled by circuit 17 to read data that has been stored therein, shift register 16 is controlled by circuit 17 to write data received from the low data rate bus lead 11B. Data appearing thereon at the same data rate as on line 11A, received from the peripherals, is written into shift register 16, which is clocked at the same rate as shift register 15. Therefore while shift register 15 is outputting data at the low data rate to low data rate bus lead 11A, shift register 16 is reading low data rate data into it from the low data rate bus lead 4B, as may be seen in FIG. 5. Bus lead 11B is Schmitt triggered at its input to reduce false signals due to noise on the line.

Following the high data rate writing activity in shift register 15 of the D, C, B and B channels described above, the low data rate channels are transmitted over the following interval of 93.8 microseconds. An interval of 15.6 microseconds following the termination of the low data rate transmission, labelled "not active" follows. The inactive period is preferred to be left idle to allow for frame synchronization due to clock frequency and phase differences, etc. It therefore forms a variable buffered interval.

The counter and control circuit 18 counts the clock pulses (e.g. 32) applied to shift register 15 by clock control and synchronization 17, and following that count applies a clock control signal to clock control and synchronization circuit 17 to cause it to switch it to clocking at the high data rate of 2,048 kb/sec after waiting for the start of the next data frame as indicated by a pulse on the F0 lead. Shift register 15, having been emptied of data, as a result writes signals received from the $ST_o$ lead, as before, having received a write enable signal from circuit 17 generated at the clock rate change line. The shift register 16 also receives a read enable signal from circuit 17 generated at the same time, which causes it to read its data out at the clock speed of circuit 17 applied to both shift registers, i.e. at the high data rate of 2,048 kb/sec. The high data rate signal is applied from shift register signal 16 through multiplexer 20, if used, to the input lead $ST_i$ of the ST bus. The signal is applied to DNIC 6, to be transmitted to the key system unit 1.

The clock signal from circuit 17 during the low data speed bus active intervals, is applied to an edge conditioner 21, which controls the rise and fall edges of the clock pulses in a manner similar to that of edge conditioner 19, and applies the clock pulses to the clock lead 11C of the low speed bus.

Following the count of 32 clock pulses applied to shift registers 15 and 16, the counter and control circuit 18 applies another control signal to circuit 17 which again enables shift register 15 to read and again reduces the clock rate to the slow bit rate, i.e. 256 kb/sec. The sequence then repeats, as may be seen in the top row of FIG. 5. The shift register 15 first writes (Tx ST-BUS In) at the high bit rate, then reads to the low speed bus at the low bit rate. When the data is being read to the low bit rate bus from shift register 15, it is written (row Rx in FIG. 5) from the low bit rate bus into register 16.

It should be noted that the output enable control of shift registers 15 and 16 could alternatively be made from circuit 18, rather than from circuit 17.

Control circuitry 22 also interfaces the $ST_o$ line, which provides a D request/channel contention line 23, and a channel selection control signal to multiplexer 20. Multiplexer 20 allows multiplexing of the converter high data rate signal from the low data rate bus to be interleaved with other high rate data from control circuit 22, which controls the multiplexer based on instructions from the KSU and monitoring the signal on the D channel request/contention line 23.

Figure 4:
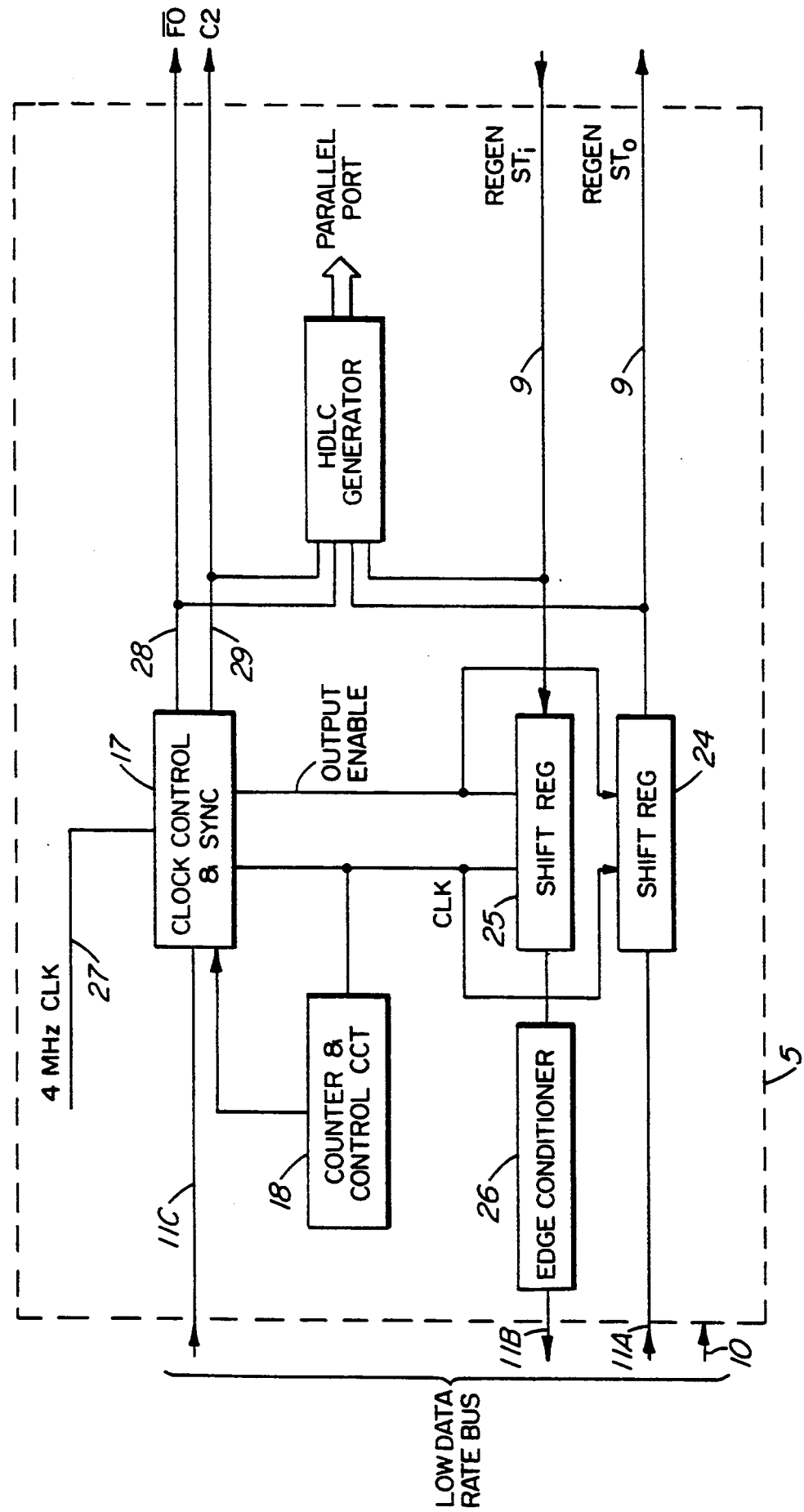
FIG. 4 is a block diagram of the converter found in each of the remote terminals.

FIG. 4 illustrates a preferred embodiment of a peripheral terminal 5. Each terminal 5 contains two 24 bit shift registers 24 and 25, which correspond and are similar to shift registers 16 and 15 respectively. A clock control and synchronization circuit 17 and counter and control circuit 18 correspond to clock control and synchronization circuit 17 and counter and control circuit 18 illustrated in FIG. 3.

Data received on low speed bus lead 11C is applied to shift register 24, which is clocked at low speed by the clock control and synchronization circuit 17. 24 bits are received, corresponding to a frame of the D, C, B and B channels. The output of shift register 24 is also enabled in a similar manner as described above, to output 32 bits of data from lead 11A.

Figure 5:
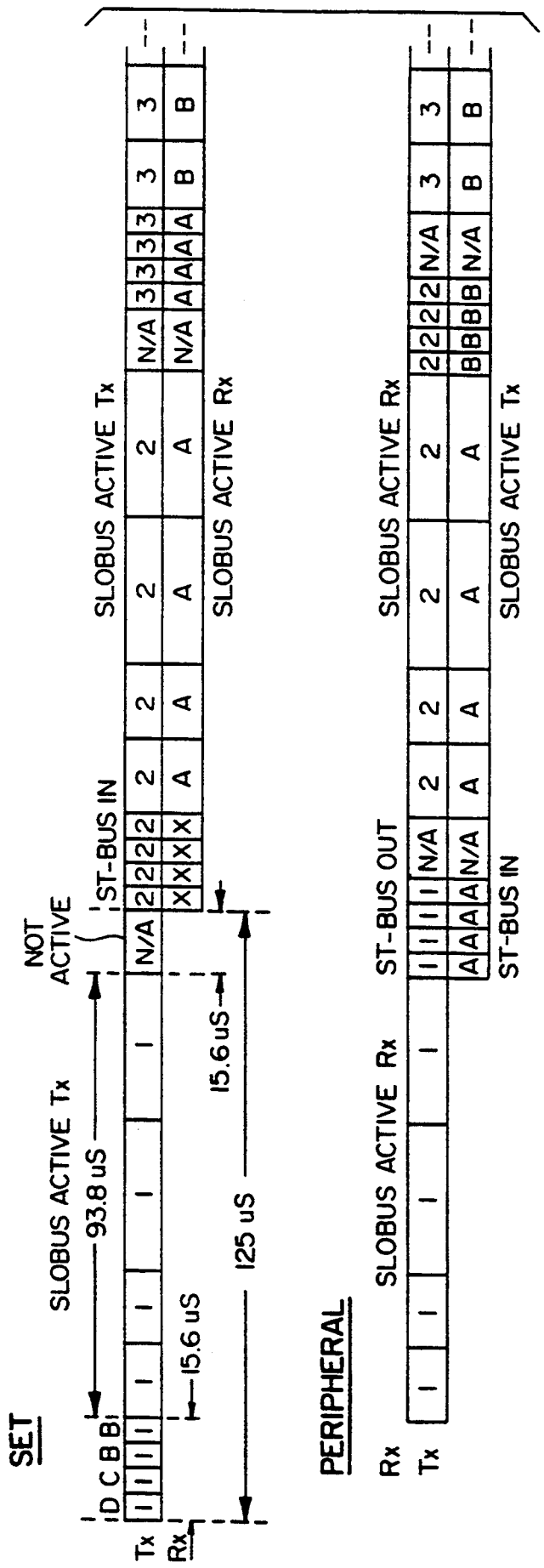
FIG. 5 is a timing diagram of data used to illustrate the operation of the invention.

The reading sequence of the four channels at low speed is shown in lines of data shown in FIG. 5, in the upper row referenced Rx (1,1,1,1,2,2,2,2, etc.).

The counter and control circuit 18 counts the 32 clock pulses and then applies a clock control signal in a manner similar to that described above to clock control and synchronization circuit 17. This causes circuit 17 to change its clock rate to the higher bit rate, and to apply clock signals to shift registers 24 and 25 at the high data rate 2,048 kb/sec. Circuit 18 also applies a signal to shift register 24 to cause it to read, and to circuit 17, causing it to generate an F0 pulse indicating the beginning of the high data rate series of channels. Shift register 24 therefore, at the high data rate, applies the signal stored therein to the high speed bus interface lead 9, which corresponds to the $ST_o$ lead of the ST bus at the output of DNIC 6.

At the same time high speed bus data is applied to the input of shift register 25, and is written to it at the high data rate.

Counter and clock circuit 18 having counted 32 clock pulses, then again applies a clock control signal to clock control and synchronization circuit 17, which applies a read enable signal to shift register 25 and changes its clock rate to the lower rate, the 256 Kbsec. When the clock on 11C again becomes active, the shift register 25 reads all of the bits of data stored therein and applies them through edge conditioner 26 to low speed bus data lead 11B. Edge conditioner 26 operates similar to edge conditioner 19, reducing or eliminating radio frequency components which would otherwise be generated by high slope and sharp cornered data pulses. The resulting signals on lead 11B are received by shift register 16 in converter 10 (FIG. 3).

It may be seen therefore that the circuit of FIG. 4 operates similar to the corresponding circuit in converter 10.

The D channel contention line 23 from circuit 22 (FIG. 3) is applied to an enable input of peripheral 5, whereby any of the terminals 5 can request transmission during any particular time interval. This is controlled by the Other Terminal and Control circuitry 22 in a well known manner for selecting which of several terminal 5 signal generators should transmit and receive during a particular time interval.

With reference to FIG. 4, a locally generated high speed clock signal (4 mHZ) is applied to clock control and synchronization circuit 17 on lead 27. The clock generated in clock control and synchronization circuit 17 (FIG. 3), edge conditioned, appearing on interface clock lead 11C, is also applied to clock control and synchronization circuit 17. The clock control and synchronization circuit 17 counts the clock pulses on line 11C. At the end of the counted twenty-fourth clock edge, signifying the last data bit of the frame, of the clock, a frame pulse is generated, which is applied to line 28. Following definition of the frame edge, the local high speed clock signal from lead 27 is applied on the clock C2 lead 29, for synchronization of other circuits in the peripheral 5, and also to provide the shift clock pulses at the high speed to shift registers 24 and 25, whereupon the data is read at high data rate from register 24 to the bus lead 9.

While there will be a phase difference between the high speed local clock signal on lead 27 and the low speed data applied to lead 11B, the phase shift time will virtually never be longer than 1 bit interval. Therefore due to the high to low and low to high speed conversion, the system is phase difference tolerant, and it is not necessary to utilize a phase locked loop or similar structure to exactly phase lock each of the peripherals to the telephone set converter clock control and synchronization circuit 17. The cost of the peripherals is thus substantially less than would otherwise be expected.

A person understanding this invention may now conceive of other alternatives or embodiments using the principles described herein. All are considered to be within the sphere and scope of the invention as defined in the claims appended hereto.

We claim:

1. Data transfer means between two high bit rate buses comprising means for temporarily storing data received from one of the buses, means for converting the data to low data rate, means for conditioning the low data rate data to remove high frequency components therefrom, means for applying the conditioned data to a low data rate bus for transmission to the other of the high bit rate buses, means for receiving and temporarily storing the conditioned data received from the low data rate bus, and means for reading the stored conditioned data at a high data rate to said other of the buses, the low data rate bus being an unshielded cable.

2. A method of transferring high data rate data between a pair of separated high data rate buses comprising storing a group of high data rate data from one of the buses, reading the stored data at a low data rate, conditioning the low data rate data to remove high frequency components therefrom, applying the conditioned data to an unshielded cable for transmission to the separated other high data rate bus, receiving and storing the conditioned data from the unshielded cable and reading the stored conditioned data at a high data rate to said other bus.

3. A method as defined in claim 2 in which the group of data is comprised of 2B+D channels of data in a frame.

4. A method as defined in claim 3 including synchronizing the frame of data applied to said other bus to a frame of data on said one bus.

* * * * *

UNITED STATES PATENT AND TRADEMARK OFFICE
CERTIFICATE OF CORRECTION

PATENT NO. : 5,341,370
DATED : August 23, 1994
INVENTOR(S) : Derek J. Nuhn, Gordon W. Servant, Robert P. Brennan, George A. Jeffrey It is certified that error appears in the above-identified patent and that said Letters Patent is hereby corrected as shown below:

Title page,
Item [73], should read as follows:

Assignee: Mitel Corporation, Kanata, Canada

Signed and Sealed this

Twentieth Day of November, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.   : 5,341,370
DATED        : August 23, 1994
INVENTOR(S)  : Derek J. Nuhn et al.

It is certified that error appears in the above-identified patent and that said Letters Patent is hereby corrected as shown below:

Title page,
Item [73], Assignee: "Pascal & Associates" should be -- Mitel Corporation, Mitel Semiconductor Americas, Inc., Mitel, Inc., Mitel Semiconductor, Inc., Mitel Semiconductor, Limited, Mitel Telecom Limited Corporation --.

Signed and Sealed this

Sixth Day of April, 2004

JON W. DUDAS
*Acting Director of the United States Patent and Trademark Office*